United States Patent
Myrenne et al.

[11] 3,728,007
[45] Apr. 17, 1973

[54] REFLECTIVE TYPE LIQUID CRYSTAL DISPLAY DEVICE HAVING IMPROVED OPTICAL CONTRAST

[75] Inventors: Karl-Dieter S. Myrenne; Clarence L. Hedman, Jr., both of Santa Clara, Calif.

[73] Assignee: SCM Corporation, New York, N.Y.

[22] Filed: May 27, 1971

[21] Appl. No.: 147,474

[52] U.S. Cl. ............................ 350/160 LC, 350/284
[51] Int. Cl. ........................................... G02f 1/34
[58] Field of Search .............. 350/160, 284, 160 LC, 350/276

[56] References Cited

UNITED STATES PATENTS

| 3,499,112 | 3/1970 | Heilmeier et al. | 350/160 |
| 3,592,527 | 7/1971 | Conners et al. | 350/160 |

Primary Examiner—Ronald L. Wibert
Assistant Examiner—V. P. McGraw
Attorney—Armand G. Guibert

[57] ABSTRACT

A high contrast reflective liquid crystal display device is disclosed comprising a transparent plate, a mirror disposed in spaced juxtaposition with the transparent plate, a mesomorphic compound confined between the transparent plate and the mirror, and means for establishing electric fields through selected portions of the mesomorphic compound. Ambient light rays impinging on the mirror are reflected along a first path. A light baffle is included which comprises a member located transverse to the first path and providing good light absorption and specular reflection. Reflected light from the mirror which is incident on the member is re-reflected along a second path to another member providing good light absorption and diffuse reflection. The mirror may be planar or serrated.

9 Claims, 10 Drawing Figures

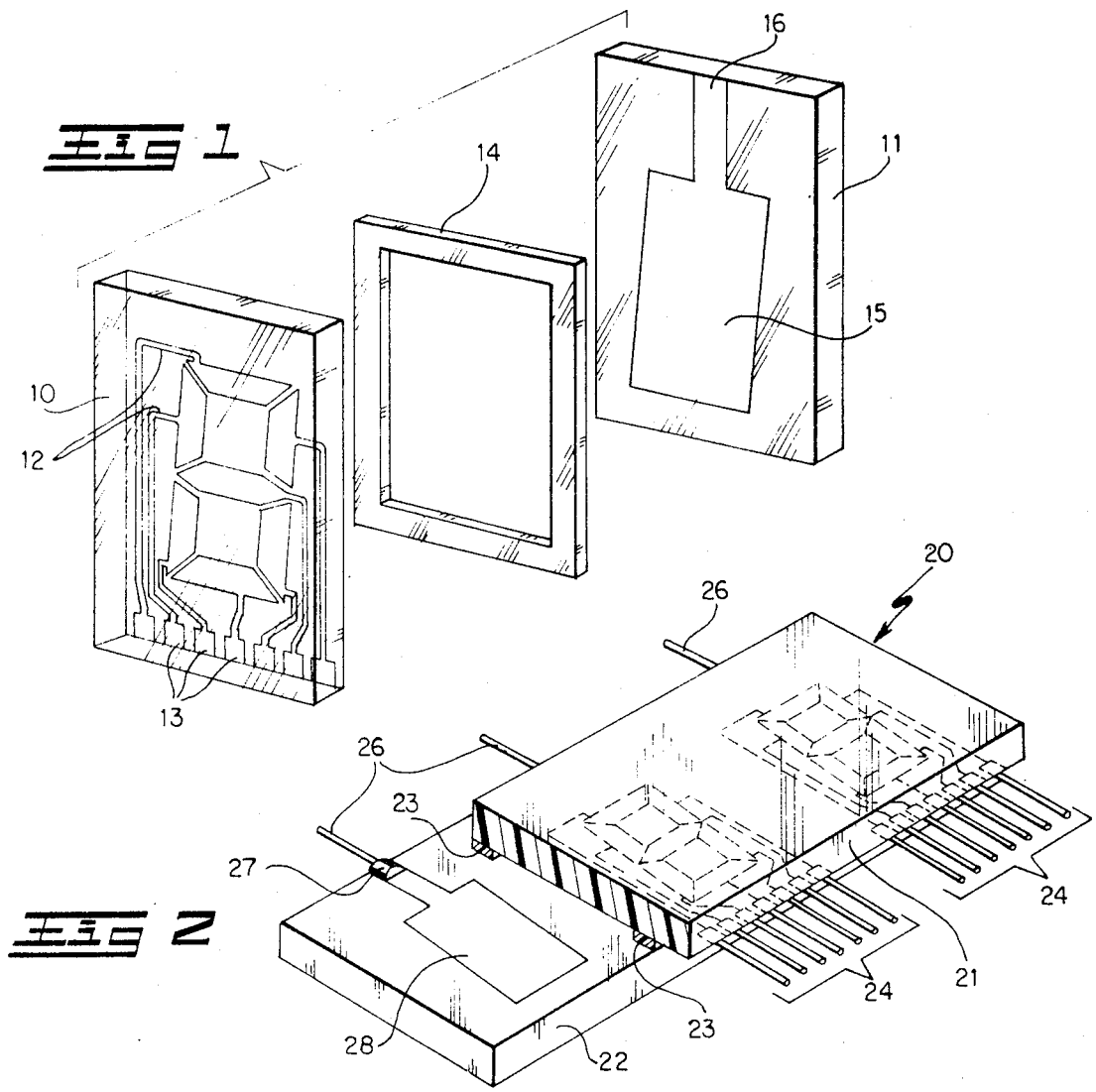
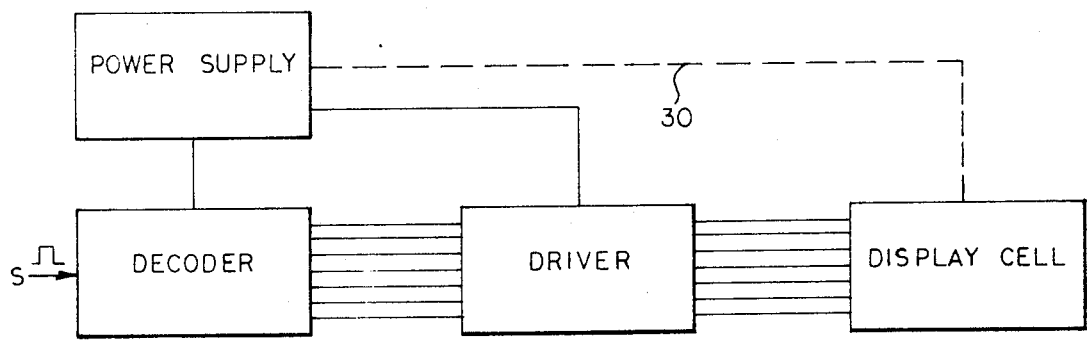
INVENTOR.
CLARENCE L. HEDMAN JR.
KARL-DIETER S. MYRENNE
BY
Robert B. Kennedy

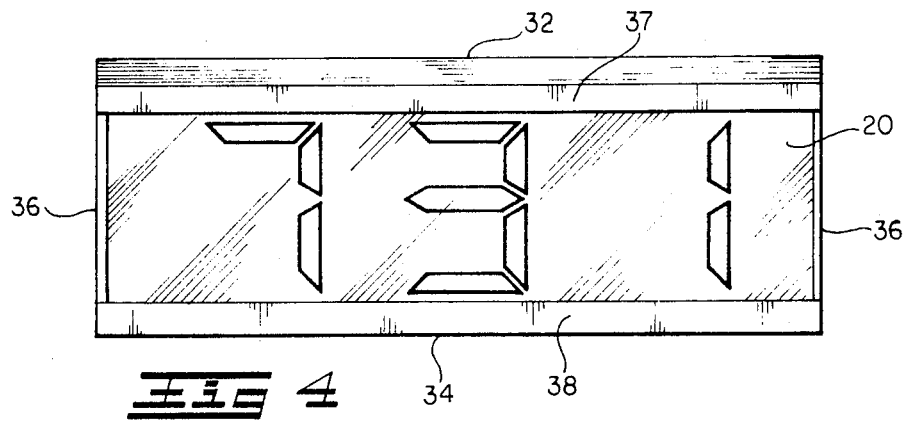
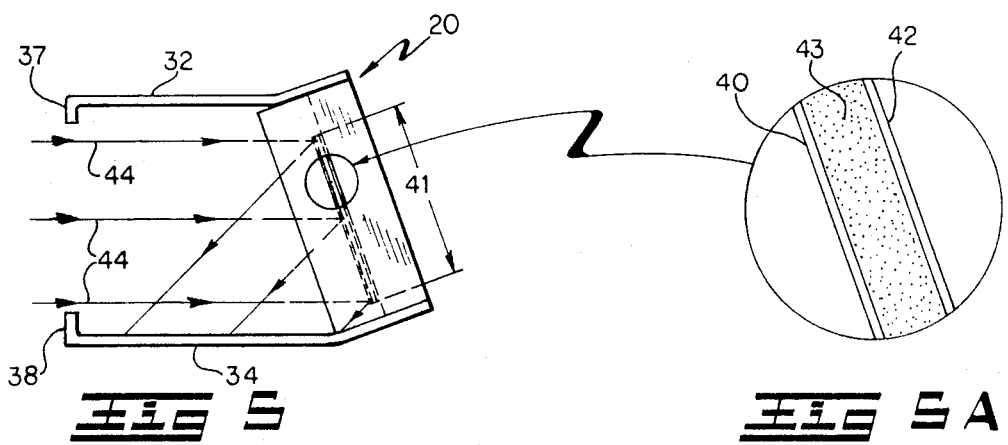
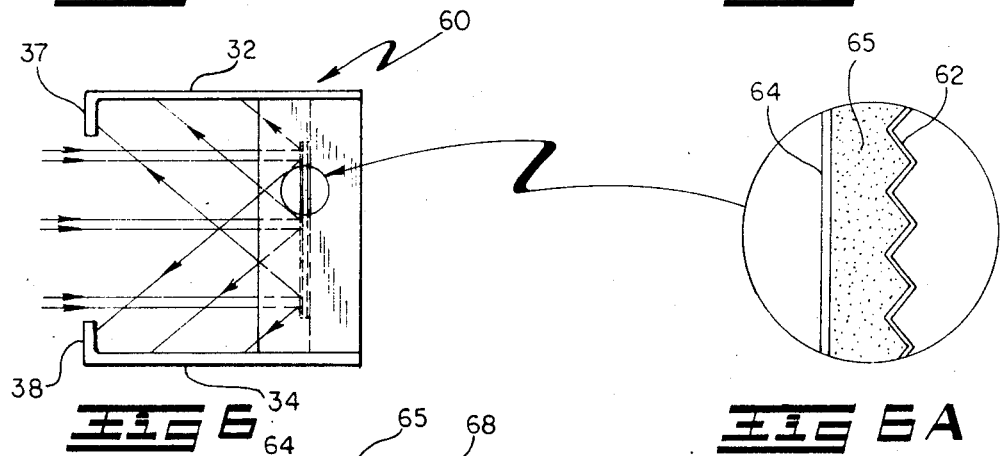
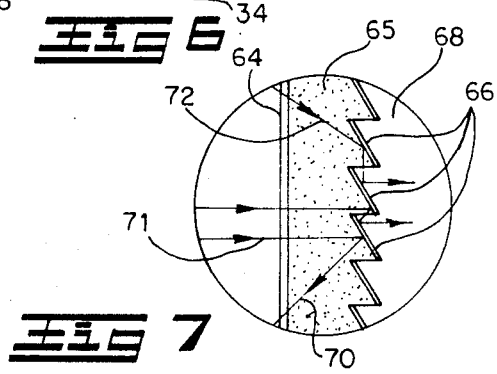

REFLECTIVE TYPE LIQUID CRYSTAL DISPLAY DEVICE HAVING IMPROVED OPTICAL CONTRAST

BACKGROUND OF THE INVENTION

This invention relates to electro-optical display devices of the type which employ crystalline liquids or "liquid crystals" as they are more commonly termed.

When thin layers of certain organic nematic liquid crystal compositions in their mesomorphic state are placed within the bounds of an electric field above a threshold value the degree of light scattering exhibited by the layers is seen to increase substantially. This phenomenon was utilized in an early light valve taught in 1936 by British Pat. No. 441,274.

More recently, it was observed that when only selected portions of such a layer of liquid crystal are placed in an electric field the increase in scattering is sharply confined to those portions lying within the field. The contrast in scattering between those portions within and those portions without the field is quite pronounced. This observation rendered liquid crystals particularly suitable for use in visual display devices. In 1967 U.S. Pat. No. 3,322,485 disclosed such a device comprising two substrates having adjacent parallel surfaces less than one-half mm. apart confining an organic nematic mesomorphic compound therebetween. Selected portions of the spaced, opposing surfaces are coated with a transparent, electrically conductive material in shapes representative of visual information such as alphanumeric characters. Each coating is connected to a source of electric energy. When the voltage thus applied reaches a threshold value, which value is determined by the composition and thickness of the particular organic nematic compound used, a change in the optical properties of the compound is observed in those regions located in the induced electric fields between the two conductive coatings. Those regions located without the bounds of the field remain transparent. The device may operate either in a transmitting mode with a light source positioned on the opposite side of the display from the observer, or in a reflecting mode with the light source and observer both located on one side. In the transmitting mode both substrates are transparent whereas in the reflecting mode only one substrate need be transparent.

The principal advantage liquid crystal type electro-optical devices offer as visual displays is that of low power consumption. Other electro-optical display devices, such as those which employ Nixie tubes, light emitting diodes, and cathode ray tubes, consume several orders of magnitude more power. In addition, liquid crystal displays usually occupy less space for the same display area and offer cost savings and high reliability. The principal disadvantages associated with their use have been those of low contrast, slow reaction time, and the need to heat many liquid crystal compositions to place them in their mesomorphic state.

Advances have recently been made in overcoming the problem of low contrast in liquid crystal display devices of the transmissive type. For example, in 1969 Great Britain Pat. No. 1,167,486 taught means for increasing the contrast ratio of electro-optical devices of the type just described. This was achieved in one manner by placing a black or light absorptive background adjacent the display so that light passing through unenergized regions of the liquid crystal layer impinge thereon and are absorbed. Another manner of enhancing optical contrast was through change in the liquid crystal composition itself. For example, it was found that the addition of trace amounts of p, n-butoxybenzoic acid to anisylidene-p-aminophenylacetate improves the clarity of anisylidene-p-aminophenylacetate liquid crystal compositions thereby rendering its appearance less milky which otherwise causes a degree of zero field scattering.

In 1970 U.S. Pat. No. 3,499,702 taught yet other means for enhancing optical contrast which term throughout this specification is intended to encompass contrast in light intensity, wavelength or both whereby viewers may visually distinguish illuminated from unilluminated regions of a display device. This last-mentioned patent disclosed that the inclusion of cross polarizers disposed on each side of a transmissive type liquid crystal display enhances contrast ratio by taking advantage of the birefringent properties of the liquid crystal composition which cause rotation of the plane of polarization of polarized light incident thereon. The presence of the first polarizer nearer the incident light source causes light emitted therefrom to pass through the liquid crystal in polarized form. The second polarizer is oriented with respect to the first polarizer so that in the absence of an electric field applied to the device a substantial portion of light passes through the second polarizer. In this condition the entire display appears uniformly bright to an observer. However, when an electric field is applied the domains of the liquid crystal composition align such that the molecules are parallel to the direction of the incident light. When this occurs the plane of polarization is not rotated and hence the second polarizer may impede the passage of light therethrough. The display thus appears dark in those regions of the applied field.

Though advances have thus been made in improving contrast in transmissive types of liquid crystal display devices corresponding advances have been lacking in those devices of the reflective type. Nevertheless, reflective type liquid crystal display devices appear to be coming into more prevelant usage due to their advantages in size, weight, and their operation by ambient lightening as opposed to device supplied and powered back lighting.

Accordingly, it is a principal object of the present invention to provide a reflective type liquid crystal display device having improved optical contrast.

SUMMARY OF THE INVENTION

Briefly described, the present invention is an electro-optical display device comprising a transparent plate and a mirror disposed in spaced juxtaposition with the transparent plate. A mesomorphic compound is confined between the transparent plate and mirror. Means are provided for establishing electric fields through selected portions of the mesomorphic compound. An ambient source of light impinges its rays on the mirror and these are reflected along a first path. A light baffle for intercepting these reflected rays comprises two surfaces. A first surface has properties of high light absorption and specular reflection and is located near the mirror and transverse to the first path. A portion of the reflected ambient light rays are absorbed and the remainder re-reflected along a second path. A second surface of the light baffle has properties of high light absorption and diffuse reflection and is located at least along the second path and transverse to it.

BRIEF DESCRIPTION OF THE DRAWING

FIG. 1 is an exploded view of a liquid crystal cell which may be used in practicing the present invention.

FIG. 2 is a perspective view of a multi-cell liquid crystal display panel with a portion of one panel member removed.

FIG. 3 is a block diagram of electrical circuitry utilized in operating liquid crystal display panels of the type shown in FIG. 2.

FIG. 4 is a front view in elevation of a liquid crystal display device incorporating principles of the present invention.

FIG. 5 is a diagrammatical side view of the device shown in FIG. 4. FIG. 5A is a greatly enlarged diagrammatical view of a portion of the device shown in FIG. 5.

FIG. 6 is a diagrammatical side view of another embodiment of the invention the front view of which is the same as the display device shown in FIG. 4. FIG. 6A is a greatly enlarged diagrammatical view of a portion of the device shown in FIG. 6.

FIG. 7 is a greatly enlarged diagrammatical side view of an alternative configuration of the liquid crystal display panel component of the display device shown in FIG. 6.

DESCRIPTION OF THE PREFERRED EMBODIMENTS

Figure 8:
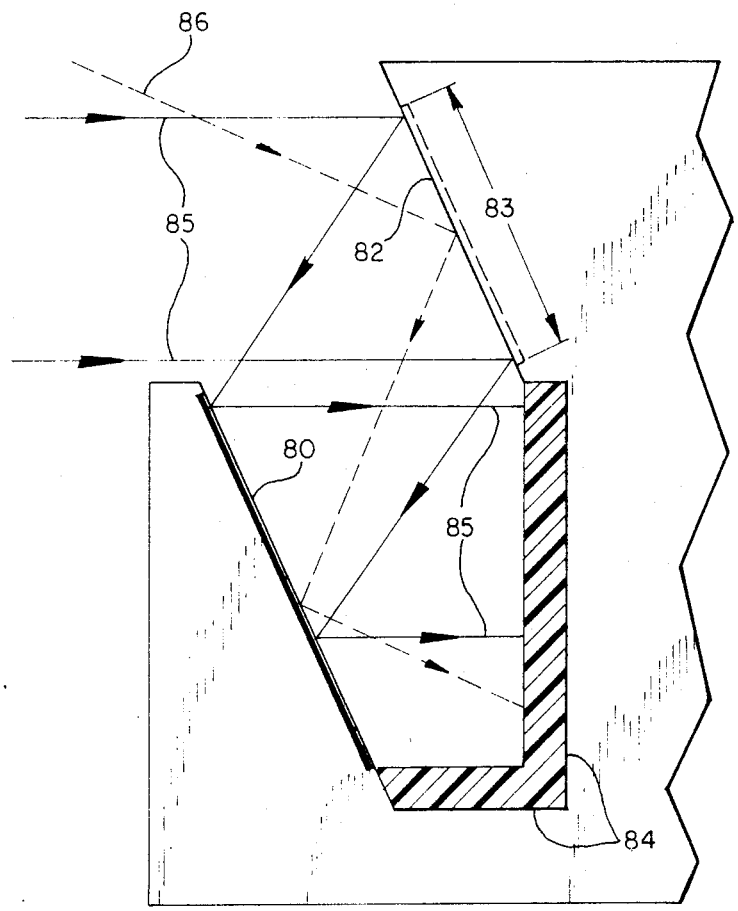
FIG. 8 is a diagrammatical side view of yet another embodiment of the invention.

Referring now in more detail to the drawing there is shown in FIG. 1 an exploded view of one cell of a liquid crystal display panel of the reflective type comprising two transparent plates 10 and 11 which plates may be made of such materials as ordinary plate glass, fused quartz and transparent plastics or resins. Two adjacent surfaces of the plates are selectively coated with an electrically conductive material. The conductive coating on plate 10 is transparent and preferably comprises indium oxide or tin oxide. This coating is seen to be patterned in the form of a blocked figure eight character consisting of seven spaced character segments. A portion of this coating extends from each segment to form an electric lead 12 which lead connects each segment with an associated segment terminal 13. The conductive coating on plate 11 is reflective and is seen to be patterned in the form of a light-reflective rectangle 15 having a periphery in juxtaposition with the periphery of the figure eight pattern on plate 10 once the two plates are assembled. An extension 16 of this coating from the periphery of rectangle 15 provides electrically connective means.

Sandwiched between the two opposing, coated surfaces of plates 10 and 11 is a hollow, dielectric spacer 14. During cell assembly the space bound by plates 10 and 11 and spacer 14 is filled with an organic nematic mesomorphic compound. Thus, spacer 14 also serves as a sealer once the cell is assembled. Examples of suitable organic nematic mesomorphic compounds include Deca-2, 4, dienoic acid, 4,4′ di-n-heptoxyazoxybenzene, 4,4′ dimethoxystilbene, and 4-p-methoxybenzylideneaminobiphenyl.

Once the cell is assembled and maintained in the temperature range in which the confined compound exhibits the nematic mesophase, that is in the temperature range above the nematic transition temperature of the compound but below the temperature at which the compound becomes isotropic, the cell may be operated by establishing one or more electric fields through the confined compound. For example, should one wish to display a figure eight connective means 16 and each of the seven segment terminals 13 would be coupled to a source of electric energy. Such energy source may be quite weak such as one capable of establishing some 20 volts between the figure eight coating segments and rectangle coating 15 with a one mil spacing therebetween. Once the threshold value is surpassed light impinging on the figure eight segments is seen to be scattered several orders of magnitude more than light passing through the plate adjacent the segments. Should one wish to display the figure zero instead connective means 16 and each segment terminal 13 except that connected to the mid horizontal segment would be coupled to the electric energy source. In this manner each numerical digit may be displayed by the single cell. A number of cells may, of course, be assembled in side by side fashion to form multi-digit numbers.

FIG. 2 illustrates a liquid crystal display panel 20 comprising three assembled cells of the type just described. Upper transparent plate 21 is seen to overlay lower transparent plate 22 with spacer 23 sandwiched therebetween. It should be noted that plates 21 and 22 are slightly offset with respect to one another. This disposition provides access to the conductive coatings on each plate so that external electrical conductors may be easily joined thereto as illustrated. Flexible cables 24 each include seven insulated conductors each of which are respectively connected to an individual segment terminal 25. Four insulated conductors 26 are likewise respectively joined to coating extensions 27 of rectangular coatings 28 on lower plate 22.

FIG. 3 illustrates in block diagram form the electrical operation of one cell of the liquid crystal display panel shown in FIG. 2. A binary coded decimal input signal S is fed into a decoder which transmits signals through one or more of seven conductors through a driver to one or more of the seven character segments in the liquid crystal display cell, respectively. A power supply for the decoder is shown which may be utilized, where required or desired, to heat the liquid crystal in the display cell, as diagramatically illustrated by line 30, to place the liquid crystal composition in its nematic state.

FIG. 4 illustrates a high contrast reflective liquid crystal display device incorporating principles of the present invention. The device includes a reflective type liquid crystal display panel 20 such as that described in FIG. 2 from the top and bottom of which horizontally project top and bottom light baffling panels 32 and 34, respectively. Two planar light baffling side panels 36 extend vertically from the sides of the liquid crystal display panel. The side panels are each joined to top and bottom panels 32 and 34. Two pendant, coplanar light baffling front panels 37 and 38 extend vertically from the leading edges of panels 32 and 34, respectively. The device is shown here in an operative mode displaying the number "731."

As may be seen more clearly by reference to FIGS. 5 and 5A panel 20 is seen to be mounted at an incline to light baffling panels 32 and 34. Planar, transparent front electrode 40, which is patterned in the form of alphanumeric segments in display area 41, and planar, reflective rear electrode 42 are thus oriented facing light baffling panel 34, liquid crystal layer 43 being sandwiched between electrodes 40, 42. With this orientation ambient light rays 44 entering the device through the spacing between front panels 37 and 38 strike and are reflected by the inclined, rear electrode 42 onto the upper surface of light baffling panel 34 which surface is black. To an observer the display panel thus appears quite dark. When one or more segments forming front electrode 40 are energized the layer of liquid crystal therebehind goes into its light scattering mode causing some of the ambient light incident thereon to be reflected back out of the device between front panels 37 and 38 for observation while light passing adjacent the energized segments continues to be reflected toward and absorbed by panel 34. Scattered light which is not reflected to the exterior is also absorbed by panel 32 and 34 or a side panel, not shown. In this manner the optical contrast of the reflective type liquid crystal display panel is greatly enhanced.

FIGS. 6 and 6A illustrates another embodiment of the invention having the same assembly of light absorbing panels as that just described. Here, however, the liquid crystal display panel 60 is mounted normally to top and bottom panels 32 and 34. Furthermore, rear, reflective electrode 62 is seen to be serrated. Front, transparent electrode 64 however remains planar. With this configuration and orientation light entering the device in the light transmissive air medium between front panels 37 and 38 is reflected both to top and bottom light absorbing panels 32 and 34 as shown by the illustrated light rays. This embodiment offers space saving advantages over that shown in FIGS. 5 and 5A at the price of a somewhat more expensive liquid crystal panel.

FIG. 7 illustrates yet another embodiment of the invention. Here, the liquid crystal display panel is mounted to the light absorbing panels in the same manner as shown in FIG. 6. The assembly itself of light absorbing panels is again the same as that of FIGS. 5 and 6 although the presence of panels 32 and 37 is optional. The principal distinction over the device shown in FIGS. 6 and 6A is that of the rear liquid crystal electrode which again is located adjacent front, transparent electrode 64 with liquid crystal 65 disposed therebetween.

The rear electrode here is seen to comprise a plurality of juxtapositioned parallel, planar, reflective segments 66 formed by coating every other surface of a jigsaw-shaped edge of glass support 68. The glass surfaces between each of the coated segments are not coated. The parallel reflective segments face bottom light baffling panel 34. With this configuration and orientation light rays which pass through unenergized portions of liquid crystal 65 are either reflected to panel 34 as ray 70 does or pass on through glass support 68 behind the reflective electrode. In addition, some stray light rays such as ray 72 are likewise reflected by segments 66 on behind the reflective electrode. All this, of course, serves to enhance the optical contrast of the display device.

The display device shown in FIG. 8 utilizes a black-backed light absorbing mirror 80 i.e. a specularly reflective good light absorber mounted parallel to a reflective type liquid crystal display panel 82 having a display area 83. The light absorbing mirror 80 faces a body of black, light absorbing plastic foam 84 i.e. a diffusely reflective, good light absorber. With this embodiment ambient light rays 85 are reflected from the display panel onto the black-backed mirror which absorbs a substantial portion of the incident light. That light which is not so absorbed is reflected onto the body of black foam which absorbs still more light. Ambient light rays from above the device, such as the ray depicted by dashed line 86 are likewise reflected off the display panel and absorbed by mirror 80 and foam 84. This configuration has been found to provide remarkably high contrast.

It should be understood that the just described embodiments are merely illustrative of principles of the invention, and that many modifications may be made thereto without departure from the spirit and scope of the invention as set forth in the following claims.

We claim:

1. An electro-optical display device comprising:
   a transparent plate (40);
   a mirror (42) disposed in spaced juxtaposition with said transparent plate;
   a nematic mesomorphic compound (43) confined between said transparent plate and said mirror;
   means (FIG. 3) for establishing electric fields through selected portions of said nematic mesomorphic compound;
   an ambient source of light rays (44 or 85) said light rays impinging on said mirror and being reflected thereby along a first path, and a tip light baffle for intercepting the reflected ambient light rays, comprising a first surface (80) having properties of high light absorption and specular reflection, said first surface being located near the mirror and transverse to said first path, whereby a portion of the reflected ambient light rays are absorbed and the remainder re-reflected along a second path, together with a second surface (84) having properties of high light absorption and diffuse reflection, the second surface being located at least along and transverse to the second path.

2. An electro-optical display device in accordance with claim 1 wherein said transparent plate has a substantially planar front surface and a substantially planar rear surface;
   said nematic mesomorphic compound is confined between said planar rear surface and said mirror; and
   said mirror comprises a first set of spaced planar mirrors disposed in spaced mutually parallel juxtaposition with said planar rear surface of the plate, said light rays being reflected along a first set of paths by said first set of spaced planar mirrors, and said light baffle being transverse to each path of said first set of paths.

3. An electro-optical display device in accordance with claim 2 further comprising a second set of spaced mutually parallel planar mirrors interposed between said first set of spaced mutually parallel planar mirrors to form a serrated mirror system, said light rays being reflected by said second set of spaced planar mirrors along a second set of paths angularly disposed with respect to said first set of paths; and wherein said light baffle includes means transverse to each path of said second set of paths.

4. An electro-optical display device in accordance with claim 1, wherein said first surface comprises a second mirror mounted parallel to said transparent plate.

5. An electro-optical display device in accordance with claim 4, wherein said second mirror comprises a sheet of glass with a black backing.

6. An electro-optical display device in accordance with claim 1 wherein said mirror is planar and said light baffle has a black first surface.

7. An electro-optical display device in accordance with claim 6 wherein said black first surface is a planar surface facing said planar mirror.

8. An electro-optical display device in accordance with claim 7 wherein said planar mirror and said planar black first surface are substantially parallel.

9. An electro-optical display device in accordance with claim 8, said second surface comprising black plastic foam disposed adjacent said planar black first surface and said planar mirror.

* * * * *